Patented Sept. 9, 1952

2,610,136

UNITED STATES PATENT OFFICE 2,610,136

MANUFACTURE OF CORRUGATED PAPERBOARD

James P. Casey, Lowell O. Gill, and Robert A. Sherman, Decatur, Ill., assignors to A. E. Staley Manufacturing Company, Decatur, Ill., a corporation of Delaware No Drawing. Application May 1, 1946, Serial No. 666,511

2 Claims. (Cl. 154—33.05)

This invention relates to adhesive compositions and methods for using them in the fabrication of laminated paper products. More particularly, it has to do with a novel starchy adhesive composition of matter in which the starch has the characteristic of swelling to a limited extent in cold water and to a greater extent in hot water, as well as to the manufacture of corrugated paperboard with such adhesive.

Corrugated paperboard is currently made in a continuous operation comprising the following main steps in the order given: a slightly moistened strip of paper is passed through heated fluting rolls; the tips of the flutes on one side of the corrugated sheet thus formed are coated with an adhesive composition; a sheet of liner paper is brought into contact with the adhesive-coated flutes of the corrugated sheet and bonded thereto by means of heat and moderate pressure; adhesive composition is applied to the tips of the flutes on the unlined side of the corrugated sheet; and a second liner is bonded to those flutes with heat and slight pressure. The component paper sheets of corrugated paperboard are commonly referred to as plies.

Bonding of the second liner to the corrugated ply presents a problem more difficult than that encountered either in bonding the first liner to the corrugated member, or in adhesively combining two smooth sheets of paper as in making solid laminated paperboard. In the latter instance, practically any desired pressure can be applied to the combined sheets to assist formation of a bond. But in uniting the second liner to the corrugated ply, only slight pressure can be used without crushing the corrugations. As a result of the limited pressure that can be safely applied in this operation, contact between liner and flute tips at many places may be poor or even absent. It is necessary, therefore, that the applied film of adhesive composition possess these two properties: one, it must be thick-bodied enough to fill in the hollows and depressions of the paper where intimate contact of flute tip and liner does not occur, and two, it must be capable, in the absence of assistant pressure, of quickly forming a bond when heated that is strong enough to permit cutting, scoring, and handling of the board as it leaves the board making machine.

Present day machines for making corrugated paperboard are operated continuously and are capable of producing 400 linear feet, or more, of board per minute. Such high machine speeds have been made possible by development and use of adhesive compositions that quickly set to a sufficiently firm bond when heated or partially dried. Initial setting of the adhesive composition is accomplished on the board making machine mainly by applying heat to the united plies with suitable heating devices, such as hot rolls or hot plates. Final setting of the bond occurs when the board is stacked and dried after it leaves the machine.

We have discovered that corrugated paperboard can be easily and cheaply made by using as the heat-gelling adhesive composition an aqueous suspension of partially hydrated starch granules in a non-gelatinous aqueous medium, as will be more fully set forth in the following description of our invention.

A principal object of our invention is to provide an improved process for the manufacture of corrugated paperboard with a heat-gelling starchy adhesive composition.

Another object of our invention is to provide an improved heat-gelling starchy adhesive composition useful in the manufacture of corrugated paperboard, the composition comprising a suspension of partially hydrated starch granules in a non-gelatinous aqueous medium.

An additional object of our invention is to provide a fluid corrugated paperboard adhesive comprising an aqueous suspension of modified starch granules that is easy and economical to prepare, that is substantially stable against gravity settling of granules therefrom, that can be applied easily and uniformly to the paper plies, that stands up well when applied to the tips of the flutes of the corrugated ply, that possesses enough water-holding power to permit its successful use with most grades of paper used in making corrugated paperboard, and that is converted by heat into a highly viscous adhesive paste.

Other objects of the invention will in part be obvious and will in part appear hereinafter.

The invention accordingly comprises the several steps and the relation of one or more of such steps with respect to each of the others, and the product possessing the features, properties, and the relation of constituents, which are exemplified in the following detailed disclosure, and the scope of the application of which will be indicated in the claims.

In accordance with our invention, the heat-gelling adhesive composition is prepared by mixing one part of a suitably modified starch with about four parts of cold water. The required modified starch is one that swells to a moderate limited extent in cold water, and swells much more or gelatinizes in hot water. A suspension of the modified starch granules in cold water is much more stable than a similar suspension of unmodified granules, especially at water to starch ratios around 4 to 1, because of the increased bulk and reduced specific gravity of the partially hydrated modified granules. We have discovered that modification of the starch can be easily controlled to give a product that swells to the desired moderate extent in cold water, and yet swells much more in hot water, yielding a thick adhesive paste. When the starch modification is properly controlled, suspensions of the modified starch in as much as five or six parts of cold water are remarkably stable towards gravity settling of the granules, have enough body to stand up well when applied to the tips of the flutes of the corrugated plies, are sufficiently water-retentive to reduce the loss of water to the paper plies and thus diminish the formation of starved bonds, and are capable of sufficient thickening when heated to provide the required bond between liner and corrugated member.

A preferred method of modifying starch to the required state is to subject it, in a slightly moistened condition, to the action of differential rolls maintained at a temperature below the pasting temperature of the starch. As a specific example of a preferred process, ordinary corn starch, adjusted to a moisture content of about 25 per cent, was passed twice through the nip of water-cooled six inch smooth differential rollers set 0.012 inch apart and rotating in opposite directions at peripheral speeds of 36 and 45 feet per minute. The milled product was then dried in a current of warm air to a moisture content of about 12 per cent and ground to pass a 100 mesh screen.

A mixture of the modified corn starch with four parts of cold water is an excellent potential adhesive composition for the manufacture of corrugated paperboard. The milled starch granules swell to a moderate extent in the cold water, yielding a stable suspension of partially hydrated granules that possesses enough body and water retentiveness to stand up well and not lose water too rapidly when applied to the flute tips of most types of corrugated plies, and still retains the ability to form a stiff adhesive paste when heated to the gelatinization temperature of the granules.

The degree to which the milled starch swells in cold water can be varied by varying the milling conditions. Other conditions remaining constant, increased swelling of the milled starch in cold water is produced by: (1) increasing the number of passes of the starch through the rolls, (2) increasing the peripheral speeds of the rolls without changing the ratio of the speeds, (3) decreasing the distance between the axes of the rolls, and (4) increasing the diameters of the rolls.

The moisture content of the starch to be milled must be controlled within certain limits or very little modification will be obtained on the differential rolls. If the starch is too dry, it passes through the rolls in a powdery state with relatively low absorption of power and with correspondingly little change in properties. On the other hand, if the starch is too moist, it goes through the rolls in an extremely plastic or rubbery condition, again with low absorption of power and with only slight changes in properties. The approximate operating limits with respect to moisture contents of various starches are as follows:

*Table*

| Kind of Starch | Percent Moisture | |
|---|---|---|
| | Lower Limit | Upper Limit |
| Sorghum | 11 | 40 |
| Corn | 17 | 34 |
| Waxy Maize | 12 | 35 |
| Rice | 10 | 35 |
| Wheat | 15 | 37 |
| Tapioca | 11 | 38 |
| Sweet Potato | 11 | 38 |
| Irish Potato | 11 | 40 |

Preferably, the temperature of the starch is held below its pasting temperature while it is being milled. Extensive fusing of the granules into structureless masses occurs when they are milled at or above their pasting temperature, whereas relatively little of this fusing takes place at lower temperatures. The fused masses of granules dry into hard tough lumps that are difficult to grind and to disperse in cold water. The fusing of granules that does occur at temperatures below the starch pasting temperature can be substantially reduced by adding a small proportion of a suitable agent, preferably aluminum sulfate, to the starch before it is milled. Up to five per cent hydrated alum, based on the starch, may be added with beneficial results. Although the addition of alum also reduces the swelling of the milled starch in cold water, this effect can be overcome by subjecting the starch to additional milling on the differential rolls.

Any given starch, or the starch content of any given starchy material, can be modified as required to meet varying needs encountered in the manufacture of corrugated paperboard. Thus, if the plies consist of sized paper, or paper containing natural sizing agents, only slight modification of the starch is required, i. e., barely enough to cause the starch granules to swell in cold water to such an extent that when suspended therein they do not readily settle out by gravity. This stage is reached when about 75 to 80 per cent of the granules no longer exhibit the polarization crosses when viewed under the microscope with polarized light. If the corrugated ply, or the liners, or both, consist of unsized water-absorbent paper, it will be necessary to increase the degree of modification so that the suspension of modified starch will have more body and water-retentivity.

Other methods are available for modifying the starch as required by our invention. Among these are the methods described in United States Patents Nos. 2,121,502 and 2,124,372 granted to Carl C. Kessler. According to these patents, starch is heated with water and certain agents that retard the swelling of starch until the granules have lost their polarization crosses. This treatment swells the granules to a limited extent, leaving them in a form that can be filtered, washed, and dried to a crumbly powdery mass. When suspended in water, and free of inhibitor, the individual granules of the dried product swell up to about the same degree as attained during the modifying treatment, and do not readily settle out by gravity. Such a suspension also thickens greatly when heated, owing to completed gelatinization of the starch granules.

Our process for making corrugated paperboard possesses several advantages over methods hitherto proposed and now in use.

The gelatinization temperatures of all the modified starches used in our process are less than those of the original starches. This permits higher machine speeds with fixed means for heating the board to set the adhesive. Atlhough this is only of minor importance in the preparation of a board that can tolerate the addition of an agent that lowers the starch pasting temperature, usually an alkali, it is of more importance in the preparation of board that requires the use of neutral or slightly acidic pastes. Examples of such boards are those used to pack window glass and other glass objects and those made with starchy adhesive compositions containing resin forming substances, such as urea formaldehyde condensation products, that quickly form water impervious bonds when heated at mildly acid reaction.

Another advantage of our process is the simplicity of preparation of the adhesive composition. After the starch has been modified and dried and ground to suitable fineness, all that is required is to mix the powdered starch with the desired proportion of water or aqueous solution of viscosity and pasting temperature regulators. This mixing can be done easily in the user's plant with simple and inexpensive equipment, and does not require expert supervision.

Still another advantage of the process of this invention is that the adhesive composition used dries at room temperature to a soft, flaky condition. This means that any of the composition spilled on unheated parts of the board making machine is easily cleaned off, even after drying. Also, the pasted and dried composition is non-abrasive and cannot score metal surfaces on the machine.

It is not essential that the starchy adhesive composition used in making corrugated paperboard according to our process be prepared from purified or refined starch. That is to say, the necessary modification of the starch granules can be accomplished just as well when the raw material is crude starch or a starch-rich material, such as cereal flour, as it can when the raw material is refined starch. Starches and starch-rich materials in general may be successfully used in our process. Specific refined starches that may be used are those derived from corn, waxy maize, sorghum, wheat, rye, rice, tapioca, Irish potato, sweet potato, and Sago palm. Specific starch-rich materials that may be used are flours prepared from corn, wheat, rye, and rice, and the so-called "table heads" obtained in the wet milling method of manufacturing corn starch.

In the following illustrative examples of starchy compositions suitable for making corrugated paperboard according to the process of our invention, the starch component contains about 12 per cent moisture, and is modified either by milling it on differential rolls or by heating it with water and a pasting retarder according to the Kessler patents cited above. All roll modified starches are prepared by adjusting the moisture of the original starch to the average of the moisture values listed for that starch in the table, passing the moistened starch twice through the nip of smooth, water-cooled, six inch rolls spaced 0.012 inch apart and rotating in opposite directions at peripheral speeds of 36 and 45 feet per minute, drying the milled product to a moisture content of 12 per cent, and grinding it to pass a 65 mesh screen. The others are prepared by heating the starch with water and swelling inhibitor, as disclosed in the Kessler patents, until about 80 per cent of the granules have lost their polarization crosses, then cooled, separated from inhibitor and excess water, and dried to about 12 per cent moisture. All parts in the examples are by weight.

*Example No. 1*

100 parts corn starch modified on differential rolls
400 parts cold water
2.8 parts borax
1.0 part caustic soda The borax and caustic soda are dissolved in the water, and the starch is then stirred into the resulting solution. The starch slurry is allowed to stand for about thirty minutes, with occasional stirring to break up small clusters of granules. Swelling of the starch practically ceases within this time, and the suspension of partially hydrated granules is then ready for use.

The borax increases the viscosity and tackiness of the adhesive composition when it is heated to gelatinization on the corrugated paperboard machine, and the caustic soda lowers the gelatinization temperature of the starch, two effects that are obviously desirable in the high speed continuous fabrication of the board. The cold solution of borax and caustic soda does not paste the starch.

*Example No. 2*

100 parts corn starch modified on differential rolls
300 parts cold water
13 parts hydrated aluminum sulfate The alum is dissolved in the water, and the starch is then stirred into the resulting solution. After the slurry of water and starch is allowed to stand for about thirty minutes with occasional stirring to break up lumps and permit the starch to reach maximum swelling in the cold water, it is then ready for use.

The alum maintains a slightly acid reaction in the adhesive. The above composition is suitable for making corrugated board to be used for packing glass articles or containers where there is danger of an alkaline paste etching the glass.

*Example No. 3*

100 parts corn starch modified on differential rolls
300 parts cold water adjusted to pH 4.0 to 5.5
15 parts water soluble urea formaldehyde condensation product After the ingredients have been mixed together and allowed to stand for about thirty minutes with occasional stirring to break up lumps and permit maximum swelling of the starch the composition is ready for use. Corrugated paperboard made with this adhesive composition is highly resistant to the weakening action of moisture.

*Example No. 4*

100 parts corn starch modified on differential rolls
400 parts cold water

The starch and water are mixed and allowed to stand for about thirty minutes with occasional stirring to break up lumps and permit maximum swelling of the starch in the cold waeer. The stable suspension of partially swollen starch granules is then ready for use.

Example No. 5

100 parts wheat starch modified on differential rolls
400 parts cold water
2.5 parts borax
1.0 part caustic soda The borax and caustic soda are dissolved in the water, and the starch is then stirred into the solution. After the starch slurry is allowed to stand for about thirty minutes with occasional stirring it is ready for use.

Example No. 6

100 parts tapioca starch modified on differential rolls
400 parts cold water

The starch and water are mixed and allowed to stand with occasional stirring for about thirty minutes. The stable suspension of partially hydrated starch granules is then ready for use as an adhesive for corrugated paperboard.

Example No. 7

100 parts sorghum starch modified on differential rolls
400 parts cold water
2.5 parts borax
1.0 part caustic soda The borax and caustic soda are first dissolved in the water, and the starch is then stirred into the solution thus obtained. After standing for about thirty minutes, with occasional stirring, the resulting starch slurry is ready for use.

Example No. 8

100 parts corn starch modified by controlled heating with cyclohexanol and water
400 parts cold water
2.5 parts borax
1.0 part caustic soda The borax and caustic soda are dissolved in the water. The modified starch, which has been washed free of cyclohexanol and dried to about 12 per cent moisture, is then stirred into the solution of borax and caustic soda. Letting the mixture stand for about thirty minutes with occasional stirring yields a stable suspension of partially hydrated starch granules that is then ready for use as an adhesive for corrugated paperboard.

Example No. 9

100 parts sorghum starch modified by controlled heating with cyclohexanol and water
400 parts cold water
2.5 parts borax
1.0 part caustic soda The modified starch, which has been washed free of cyclohexanol and dried to about 12 per cent moisture, is stirred into the solution of borax and caustic soda in the water, and allowed to stand for about thirty minutes with occasional stirring. The resulting stable suspension of partially hydrated starch granules is then ready for use.

Example No. 10

100 parts tapioca starch modified by controlled heating with cyclohexanol and water
400 parts cold water The starch and water are mixed and allowed to stand for about thirty minutes with occasional stirring. The stable suspension of partially hydrated starch granules is then ready for use as an adhesive for making corrugated paperboard.

It is to be understood that the foregoing examples of starchy adhesive compositions suitable for making corrugated paperboard according to the process of our invention are illustrative only and do not indicate the full ranges of ingredient proportions and kinds of modified starches embraced by our invention.

The ingredient ratios of the composition, such as the ratio of water to starch, and the ratios of starch to agents that lower the starch pasting temperature and that increase the hot paste viscosity, can be varied over fairly wide ranges to suit the needs and desires of the corrugated paperboard manufacturer. If it is desired to economize on starch by using a high ratio of water to starch, such as, for example, a ratio of 5 to 1, it may become necessary to decrease correspondingly the ratio of starch to agent that increases the hot paste viscosity, and to increase correspondingly the degree of starch modification, so that the starch will swell more in cold water and maintain the body or viscosity of the cold water suspension at a desirably high level. On the other hand, if an unusually strong bond between plies is desired and is obtained by using a decreased ratio of water to starch, it may be necessary to reduce the degree of starch modification somewhat, otherwise the more concentrated suspension of partially swollen starch granules may be too thick for satisfactory application to the plies.

The adhesive composition should be viscous enough to be picked up well by rolls and to stand up on the tips of the corrugated ply when applied thereto. We have found that in order for the adhesive to behave properly in this respect, its viscosity should not be less than about 50° MacMichael, determined according to the following procedure:

Thirty grams of starchy material, dried to 12 per cent moisture and ground to pass a 65 mesh sieve, was stirred mechanically for 2 minutes with 250 ml. of water at 30° C., and then allowed to stand for 30 minutes at the same temperature. The suspension of starch in water was then poured into the large cup of a MacMichael viscosimeter. The disk plunger was immersed in the suspension in the cup and attached to the No. 30 wire. The cup was then rotated at 40 R. P. M. The resulting twist on the wire, which is a measure of the suspension viscosity, is read in circular degrees and reported as degrees MacMichael (° M.).

Although the viscosity of the adhesive preferably should not be less than about 50° MacMichael, neither should the corrugating adhesive be so thick that it will not satisfactorily be picked up by the rolls and spread on the tips of the corrugated ply. In other words, it must be a fluid suspension, or one that will flow fairly readily.

Preferably the ratio of water to starch solids in the adhesive composition should lie within the range of about 2.5 to 7 but useful results can be obtained with water to starch ratios as high as ten to one.

The only limitations on the degree of starch modification are that the modified starch must swell substantially more in hot water than in cold, and that the swelling in cold water must not be so great that the viscosity of the suspension of the starch in cold water, at a selected ratio of water to starch, is so high as to impede application of the suspension to the flutes of the corrugated ply.

It should be noted that our starchy adhesive compositions do not contain a gelatinous or viscous liquid carrier medium. The modified starches contemplated by our invention swell to moderate limited extents in cold water, but are substantially insoluble therein. That is, no appreciable proportion of the modified starch granule escapes into the aqueous medium to form a colloidal or viscous solution. Centrifugation of the cold water suspensions of the partially hydrated starch granules yields supernatant liquors that are not appreciably more viscous than water alone or the aqueous solution in which the starch was originally mixed. This is true even though the water contains proportions of borax and sodium hydroxide used in several of the foregoing examples. These alkaline materials cause the modified starch to swell slightly more than it does in water alone, but they do not dissolve or colloidally disperse any of the starch.

Numerous inexpensive fillers and extenders such as soy flour, powdered seed hulls, and clay may be added to the starchy adhesive composition if it is so desired. Other materials may be incorporated in the adhesive compositions without departing from the scope of our invention. Among these are wetting agents and anti-foaming agents, well known to those skilled in the art.

While only one specific method of manufacturing corrugated paperboard has been set forth, this is to be considered merely as illustrating the invention. For example, the adhesive composition may be applied to a liner in suitably spaced crosswise narrow bands and the machine operation so arranged that the tips of the flutes of the corrugated ply are contacted with adhesively coated bands on the liner. Or, if desired, a continuous coating of adhesive may be applied to the liner. Also, it is not essential that the flow of paper plies into and through the corrugated paperboard machine be a continuous one; it may be intermittent or discontinuous. Or, the preparation of the corrugated paperboard may consist of a simple batch process in which definite sized sections of the board are made separately.

Our heat gelling starchy adhesive compositions are also especially useful in the preparation of single faced corrugated paperboard, and compound board containing more than one corrugated ply.

Since certain changes in carrying out the above process, and certain modifications in the product which embody the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. In the process of making corrugated paperboard wherein a liner ply is bonded to the corrugated ply by means of a heat-gelling amylaceous adhesive, the improvement comprising: applying to one of said plies, on the surface to be joined, an aqueous adhesive composition of which the sole amylaceous ingredient is ungelatinized, modified starch, said starch having been modified by milling at a 10 to 40% moisture content on differential rolls below its pasting temperature, to such an extent that the starch granules partially swell in cold water yielding a fluid suspension relatively stable in regard to viscosity changes and sedimentation; assembling the plies and heating the assembly, whereby gelatinization of the starch and bonding of the plies occur.

2. The process of claim 1 wherein said aqueous adhesive composition has a pH below 7.

JAMES P. CASEY.
LOWELL O. GILL.
ROBERT A. SHERMAN.

REFERENCES CITED

The following references are of record in the file of this patent:

UNITED STATES PATENTS

| Number | Name | Date |
|---|---|---|
| 610,183 | Higgins | Sept. 6, 1898 |
| 620,756 | Duerden | Mar. 7, 1899 |
| 660,579 | Knoch | Oct. 30, 1900 |
| 1,184,748 | Hicks | May 30, 1916 |
| 1,904,619 | Caesar | Apr. 18, 1933 |
| 2,051,296 | Goettsch | Aug. 18, 1936 |
| 2,102,937 | Bauer | Dec. 21, 1937 |
| 2,105,052 | Oltmans | Jan. 11, 1938 |
| 2,219,065 | Bruker et al. | Oct. 22, 1940 |
| 2,301,695 | Gillian | Nov. 10, 1942 |
| 2,464,081 | Hansen et al. | Mar. 8, 1949 |